United States Patent [19]
Smeets

[11] 3,888,910
[45] June 10, 1975

[54] SURFACTIVE MATERIAL AND ITS PREPARATION

[75] Inventor: Fred Smeets, Tienen, Belgium

[73] Assignee: La Citrique Belge, N.V., Tiene, Belgium

[22] Filed: Sept. 14, 1971

[21] Appl. No.: 180,450

Related U.S. Application Data

[63] Continuation of Ser. No. 742,540, July 5, 1968, abandoned, which is a continuation-in-part of Ser. No. 563,816, July 8, 1966, Pat. No. 3,586,715.

[30] Foreign Application Priority Data

July 19, 1965   United Kingdom............... 30640/65
July 5, 1967   United Kingdom............... 31014/67
Oct. 19, 1967   United Kingdom............... 47676/67

[52] U.S. Cl.......... 260/479 R; 252/142; 260/481 R; 260/513 R
[51] Int. Cl.......................................... C07c 143/54
[58] Field of Search.................... 260/481, 479 R

[56] References Cited
UNITED STATES PATENTS

| | | | |
|---|---|---|---|
| 2,548,017 | 4/1951 | Hedrick | 260/515 |
| 2,548,018 | 4/1951 | Hedrick | 260/515 |
| 2,548,019 | 4/1951 | Hedrick | 260/515 |
| 2,548,020 | 4/1951 | Hedrick | 260/515 |

Primary Examiner—James A. Patten
Attorney, Agent, or Firm—Cushman, Darby & Cushman

[57] ABSTRACT

Biodegradeable surface-active material, which when formulated into cleansing, e.g., detergent, compositions provides improved cleansing properties over conventional dispersing or cleansing agents, is obtained by forming esterifying an unsaturated polycarboxylic acid material or the corresponding sulfo-acid material with a mono- or poly-hydroxy containing non-ionic surfactant, and converting the resulting ester(or sulfo-ester), to the corresponding sulfonate salt, e.g. sodium sulfonate salt, wherein said unsaturated polycarboxylic acid is the hydrolyzed reaction product of pyrolysing al alkali earth citrate at a temperature between 250°C to 400°C. Any carboxylic acid groups not esterified with the non-ionic surfactant, may be esterified with other esters, or converted into amides, amines or salts. The said acid material may be in the form of a complex ester with a polyhydroxy alcohol.

11 Claims, No Drawings

SURFACTIVE MATERIAL AND ITS PREPARATION

This is a continuation application of copending application Ser. No. 742,540, filed July 5, 1968, now abandoned which in turn was a continuation-in-part application of application Ser. No. 563,816, filed July 8, 1966, now U.S. Pat. No. 3,586,715.

This invention relates to a surface-active material which has improved properties over surface-active compounds previously conventionally employed, and particularly relates to surface-active material which is the reaction product of an unsaturated polycarboxylic acid material or the corresponding sulfoacid material, obtained by the controlled pyrolysis and subsequent hydrolysis of an alkaline-earth citrate, described in Pat. Specification No. 563,816, the entire contents of which are incorporated herein by reference. The invention further relates to surface-active compositions, including wetting solutions and dispersant and detergent liquids, emulsions, pastes and powders comprising such surface-active material.

A class of surface-active compounds which has hitherto been widely used, either alone or in combination with other compounds, is the so-called anionic surfactants having a mono-acid function. These compounds include a monocarboxylic acid salt, for instance salts of long-chain monocarboxylic acid, e.g. sodium stearate; a monosulfonic acid salt for instance a salt of an alkyl aromatic sulfonic acid, e.g. dodecyl benzene sodium sulfonate; and monosulfate salts, for instance a salt of a long-chain aliphatic sulfuric acid, e.g. lauryl sodium sulfate and myristyl sodium sulfate. Such compounds find a variety of uses, e.g. as wetting agents, dispersants or detergents, and are capable of exercising their different functions by modifying the hydrophobic portion of the molecule, e.g. altering the chain length and/or chain configuration of an aliphatic salt; or the number and/or configuration of the alkyl substituent(s) of aromatic salts.

A further class of surface-active agents are the so-called non-ionic surfactants, which are characterized in that they do not contain a metal, and rely for their surface-activity by combining in the same molecule an organic hydrophobic portion and an organic hydrophilic portion. Such compounds may be predominatly hydrophobic or predominatly hydrophilic in character, depending on the nature and structure of the said two portions of the molecule. The hydrophobic portion is an aliphatic or cyclic hydrocarbon residue, while the hydrophilic portion is a polyether group, possibly, but not necessarily containing one or more hydroxy or ester groups.

The polyether groups may conveniently be derived by reaction of a hydroxylated hydrophobic compound with an alkylene oxide, particularly ethylene oxide or propylene oxide. The degree of hydrophilicity of the final compound is then a function of the number of polyether groups formed by the said alkoxylation process.

With non-ionic surfactants of the type described, the properties of the final molecule may be modified by altering the structure of either or both of the hydrophobic and hydrophilic portions of the molecule. Thus, non-ionic surfactants are inherently more versatile than the anionic surfactants of the type described, in that either or both of two portions of the molecule may be modified to produce desired properties of the final product, whereas only the one (hydrophobic) portion of anionic surfactants can be modified.

Patent application Ser. No. 563,816 now U.S. Pat. No. 3,586,715 describes unsaturated acid material derived from the controlled pyrolysis of an alkaline earth metal salt of citric acid, namely by heating the said alkaline earth metal salt for a period of time and at a temperature preferably not less than 230°C, more preferably in the range of 250°C to 400°C, and particularly in the range 300°C to 375°C, until an increase in titratable alkalinity is obtained, and until not more than 32% by weight of the original citric acid salt remains, whereupon the product is hydrolyzed using conventional hydrolysis techniques for the production of acids from their corresponding salts, and an unsaturated acid material is obtained.

The chemical identity of the said unsaturated acid material has not precisely been determined. It is different from, although it may contain, aconitic acid, the aconitic acid may be removed from the material if desired either before or after the hydrolysis step. Any inorganic salts generated during the controlled pyrolysis can also be removed, if desired. From analysis carried out on the pyrolysis product, it appears that the unsaturated acid component is a derivative of an as yet unidentified unsaturated acid containing more than three carboxylic acid groups per molecule.

The said acid material may be sulfonated by contacting a solution of the said material with bisulfite ions under acid conditions. Thus a bisulfite or sulfite compound may be introduced into the said compound, or SO₂ injected into the said solution, to produce a corresponding sulfo-polycarboxylic acid material. By these means a sulfo-polycarboxylic acid material is obtained which is then utilized according to the present invention to obtain the surface-active materials of the present invention.

It has now been discovered that surfactant material may be obtained which is superior to surfactants previously described, in that greater possibilities are provided for modifying the structure of the molecule of the material obtained, and furthermore the material possesses a combination of properties not possessed by either of the classes of compounds hitherto described.

The invention consists of a surfactive material comprising the ester reaction product of at least one hydroxy equivalent of a non-ionic surfactant containing at least one hydroxy group, with not more than four carboxylic acid equivalents of an unsaturated polycarboxylic acid material. The foregoing may be thusly represented by the classical ester reaction

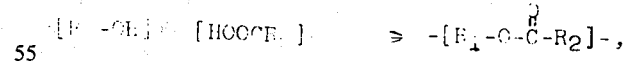

where —[R₁—OH] is a mono- or poly-hydroxy-containing non-ionic surfactant, [HOOCR₂]— is the unsaturated polycarboxylic acid, the —[ ] and [ ]— portions of the formula indicating that additional OH and HOOC groups, respectively, may be present and the —[ ]— portion of the formula indicating that additional ester linkages may be present. In the product formula R₁ is the corresponding residue of the mono- or poly-hydroxy-containing surfactant and R₂ is the corresponding residue of the unsaturated polycarboxylic acid after esterification reaction between at least one hydroxy and at least one carboxylic acid group. The remaining carboxylic acid group or groups on $R_2$ and the remaining hydroxy group or groups (if any) on $R_1$ may also be further esterified, as indicated above, in a like manner or may be esterified with a different hydroxy containing compound or carboxylic acid compound, respectively, as described in detail below. Irrespective of further esterification, however, the compounds of the invention will always have at least one esterified linkage of the general formula

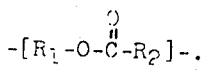

The said polycarboxylic acid material is obtained by a process which comprises pyrolysing an alkaline earth citrate at a temperature of from 250°C to 400°C for a period of time until an increase in titratable alkalinity of the reaction mixture is obtained, and converting the unsaturated salt material thereby obtained to the corresponding acid material.

After the esterification reaction has been completed, sulfonation across the double bonds of the unsaturated polycarboxylic acid residue may be effected, and the resulting sulfo-ester neutralized to form the corresponding sulfonate derivative (e.g. sodium sulfonate derivative). The sulfonated and neutralized ester linkage (described above) may thus be further represented by the formula

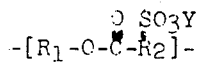

where Y is the neutralizing salt forming group, $SO_3$ is the sulfonating group across the double bonds of the acid and $R_1$ and $R_2$ are as described above.

Alternately, the unsaturated polycarboxylic acid may be sulfonated in the manner described above prior to esterification to form the sulfo-polycarboxylic acid materials, instead of sulfonating after esterification. If a sulfo-polycarboxylic acid material has been used for the esterification, the resulting ester may be simply neutralized to form the corresponding sulfonate salt.

Particularly useful surfactive materials are provided by a composition comprising the surfactive material according to the invention and one or more non-ionic surfactants, preferably present in a proportion of from 10 to 200% by weight of the surfactive material according to the invention. Such a combination provides a synergistic improvement in surface-active effects, water solubility, and foaming characteristics.

Non-ionic surface-active agents containing one or more free Hydroxyl groups which may be used to esterify the polycarboxylic sulfonate to produce the surfactive material according to the invention include those described in Chapter 8 of "Surface Active Agents" by Schwartz - Perry - Interscience Publishers Inc. - New York, 1949. Specific classes of non-ionic surface-active agents include alkoxylated hydrophobic hydroxy compounds, e.g. the reaction product of an alcohol or phenol with more than one mole per hydroxy group of ethylene or propylene oxide. Suitable alcohols which may thus be alkoxylated include $C_8 - C_{24}$ aliphatic alcohols, for example, fatty alcohols, oleyl alcohols, glycols, alkylated $\beta$-napthol, oxo alcohols, ether alcohols, secondary alcohols made by reducing the ketones obtained by pyrolysis of synthetic paraffin wax fatty acids, polyalkyl cyclohexanols made by the reduction of the corresponding isophorones, sod oil, alkyl phenols, complex phenols derived from condensation of a simple phenol with an aldehyde or ketone e.g. condensation of alkyl cyclohexanone and phenol.

Preferred non-ionic surface-active agents which may be used to esterify the acid material according to the invention, are the polyethoxylated or polypropoxylated $C_{14} - C_{22}$ monohydric or polyhydric aliphatic or cyclic alcohols, e.g. oleyl, cetyl and stearyl alcohol, wax and tallow alcohols, and cyclic alcohols such as naphthols, phenols, alkyl phenols, e.g. $C_8 - C_{12}$ alkyl phenols, and bisphenols.

Other alcohols which may be used include ether alcohols, e.g. the "Carbitols" (the term "Carbitol" is a Trade Mark) and polyglycols, sugar alcohols and partial esters thereof e.g. sorbitol esters, glycols including ethylene and propylene glycols, and pentaerythritol or partial esters thereof and "Cellosolves" (a Trade Mark).

Preferably the non-ionic surfactants employed as esterification agents according to the invention are those which contain a single free hydroxyl group.

The surfactive ester material according to the invention may be an ester in which at least 25%, e.g. 25 to 75%, or all, of the carboxylic groups of the polycarboxylic acid material have been reacted with the non-ionic surfactant. The remaining carboxyl groups (if any) preferably being esterified (before, during or after the esterification with the said non-ionic surfactant), with one or more monohydric or polyhydric alcohols, e.g. $C_1 - C_{24}$ monohydric alcohols, (which may be straight or branched chain alcohols, including keto-, ether- and sugar-alcohols). If desired some or all of the remaining carboxylic groups may be reacted so that their acid function becomes modified in other ways, for example by conversion to salts (e.g. sodium or ammonium salts), amides or amines.

The surfactive ester group so produced may be in the form of a simple ester, which may be a full, partial and/or mixed ester, or it may be in the form of a complex ester, in which at least two polycarboxylic acid residues are joined by a polyhydroxy alcohol residue, e.g. a glycol or glycerol residue. The formation of such a complex ester structure may be effected either before, during or after, reaction of the unsaturated polycarboxylic acid material (or the corresponding sulfo-acid material) has been partially esterified with the non-ionic surfactant according to the invention.

A particular advantage of the surfactive material according to the invention is that it is biodegradeable. A further advantage is that the surfactive material according to the invention is readily adapted to the particular desired use by modifying the structure at the many locations in the reaction product which are capable of ready modification. Thus the structure and nature of either or both of the hydrophobic and hydrophilic portions of the non-ionic surfactants used for esterification may be selected to provide the required properties to the final ester product, and furthermore the ester, salt, amide or amine function of the remaining unreacted carboxylic acid groups may similarly be selected.

The surfactive materials according to the invention may readily be adapted for use as detergents or in liquid paste or powder detergent compositionss. Thus a particularly useful class of non-ionic surfactants which may be used for esterification are polyalkoxylated, e.g.

polyethoxylated alkyl phenols, for example phenols containing one or more $C_6$ - $C_{14}$ alkyl side-chains; which may be linear or branched, and which have been reacted with ethylene oxide whereby from 2 to 50 ethylene oxide molecules react to form the alkoxylated chain thereon. The particular number of alkoxy units in the final non-ionic residue of the surfactive material according to the invention depends on the particular hydrophilic/hydrophobic balance to be struck, taking into account the number of non-ionic surfactant molecules reacted per mole of polycarboxylic acid starting material, and also on the nature of hydrophobic groups which may be attached to remaining carboxylic acid groups of the said polycarboxylic acid material.

Another useful class of non-ionic surfactive material for preparing detergent compounds is alkoxylated, e.g. ethoxylated aliphatic monohydric alcohols, particularly $C_8$ - $C_{24}$ alcohols which may contain from 2 to 50 ethoxy groups in the alkoxy chain. The hydrophilic/hydrophobic balance may be adjusted using such alcohols in like manner as for alkoxylated alkyl phenols as hereinbefore described.

Cleansing compositions containing the surfactive material according to the invention may be in the form of liquids, gels, emulsions, pastes or powders, and may include other compounds and material normally included in such compositions, e.g. in powders, builders, fillers and optical whiteners. Particularly improved cleaning, for example detergent, properties are provided by such compositions if they have incorporated in them, in addition to the surfactive material according to the invention, one or more non-ionic surfactants, particularly of the type hereinbefore described.

A surprising feature of such compositions is that as hereinafter more fully described the cleansing effect of the surfactive material according to the invention in hard water does not require the presence of large proportions of water-softening, i.e. sequestering agents, to expedite their cleansing effect. Such compositions also exhibit little or no turbidity in either hard or demineralized water, particularly at elevated temperatures. They may thus be used in general purpose laundering, including laundering of wool and man-made fibers.

The following examples of the invention are provided, Example 1 being to the production of a surfactive material according to the invention.

EXAMPLE 1

Detergent material derived from ethoxylated tallow alcohol and sulfonated polycarboxylic acid material 600 cc of an aqueous solution of sulfo-acid material having a concentration 12.850 milliequivalents/liter, obtained by the controlled pyrolysis of calcium citrate at a temperature of from 250°C to a final temperature of 350°C for 3 hours, followed by hydrolysis and sulfonation of the resulting acid material; 1100 gms of ethoxylated tallow obtained by reacting 11 moles ethylene oxide per hydroxyl equivalent; and 1020 gms of n-butyl alcohol; were introduced into a reaction vessel provided with an agitator, and the contents reacted with stirring at a temperature between 60°C and 85°C under a reduced pressure of about 100 mm Hg. An azeotropic mixture consisting of butyl alcohol and water, was distilled off and collected in a water separator, the supernatant alcoholic layer being returned continuously to the reaction vessel. After 10 hours the reaction was almost completed and the remaining acidity was neutralized to pH 7:0 with sodium hydroxide solution, and excess alcohol removed by distillation under reduced pressure.

The thus obtained sodium sulfonate ester material can be obtained as an aqueous concentrated solution, and it can be used in liquid detergent formulations or formulated with fillers/builders into highly efficient laundering powders, or formulated into pastes, gels or emulsions.

A number of detergent powders were formulated comprising the sulfonate ester prepared according to Example 1 as the detergent component, in differing proportions, each of the rest of the detergent compositions comprising like ratio of fillers and builders conventionally used in detergent compositions.

The said detergent compositions were used to launder standard soiled cotton test-pieces, using a wash liquid containing 5 gm/liter of detergent powder containing builders. The test washes were performed in a Launder-O-Meter machine, for 10 minutes at 80°C, followed by 4 rinses. For comparison, similar standard soiled cotton test-pieces were washed using a commercially-available detergent powder based on alkyl benzene sulfonate containing 24% by weight of total surfactive components.

The results, expressed in terms of % soil elimination, are expressed in the accompanying table.

| | Wt. % surfactive Component | | | | |
|---|---|---|---|---|---|
| | in powder according to invention | | | | in commercial powder |
| % elimination of soil | 2 | 4 | 6 | 8 | 24 |
| | 54.2 | 59.7 | 64.9 | 67.2 | 59.1 |

Particularly useful detergent compositions are provided in which the surfactive components are provided by the surfactive material according to the invention together with one or more non-ionic surfactant compounds, whereby even greater dirt-elimination is obtained. Although non-ionic surfactant compounds have previously been incorporated in previously known detergent compositions, their presence is rendered necessary by the presence of soap whereby they act as a calcium soap dispersant, and for foam regulation. Detergent compositions containing the surfactive material according to the invention need not however include soaps in their formulation, and in fact superior results are obtainable over previously-known compositions without the presence of soap. It has surprisingly been found however, that a yet further improvement may be provided in detergent compositions if from 10 to 200% by weight of at least one non-ionic surfactive compound is present, based on the surfactive material according to the invention.

This effect is shown in Example 2.

EXAMPLE 2

A surfactive material according to the invention was prepared as follows:

Detergent material derived from ethoxylated nonylphenol and sulfo-polycarboxylic acid material 36.4 liters of an aqueous solution of sulfo-acid material, having a concentration of 11,000 milliequivalents/liter, obtained by the controlled pyrolysis of calcium citrate at a temperature of from 250°C to 350°C for 3 hours, followed by hydrolysis and sulfonation of the resulting acid material; 46.9 kgms. of ethoxylated nonylphenyl, obtained by reacting 8.5 moles ethylene oxide per hydroxyl equivalent, and having a hydroxyl value of about 94.3; and 45 kgms. of n-butyl alcohol; were introduced into a reaction vessel provided with an agitator and the contents reacted with stirring at a temperature between 60°C and 85°C under a reduced pressure of about 100 mm Hg. An azeotropic mixture consisting of butyl alcohol and water was distilled off and collected in a water separator, the supernatant alcoholic layer being returned continuously to the reaction vessel. After 8 hours the reaction was almost completed and the remaining acidity was neutralized to pH 7.0, with sodium hydroxide solution, and excess alcohol removed by distillation under reduced pressure.

Two detergent powders were prepared each containing 5% by weight of the detergent material prepared as above, together with 35% of sodium tripolyphosphate, 20% of sodium perborate, 7% of sodium meta-silicate and 15% of sodium sulphate, together with trace amounts of optical whitening agent and sodium carboxy methyl cellulose, remainder water.

Powder A had the above formulation, and

Powder B contained in addition 2% by weight based on the total composition, of a mixture of equal parts of two ethoxylated nonyl phenols, one containing 9 ethoxy groups per mole, and the other 14 ethoxy groups per mole.

The above powders were tested by washing standard soiled cotton swatches. Typed 1 being the socalled "U.S. Testing Company Standard" and Type 2 being the so-called "Test Fabrics Inc. Standard." The washing was carried out in a Launder-O-Meter washing machine at 85°C for 20 minutes, using water containing 220 parts per million hardners expressed as $CaCO_3$, and 5 grams/liter of the said powders. The elimination of soil in both instances was compared with a commercial heavy-duty detergent washing powder containing 20% of total surfactive material, under identical conditions.

The results were as follows:

|  | % Elimination of Soil | |
|---|---|---|
|  | Type 1 | Type 2 |
| Powder A | 26.8 | 66.6 |
| Powder B | 32.0 | 70.6 |
| Commercial Powder | 19.1 | 55.6 |

Further, the washing solutions containing Powder A and Powder B were limpid on dissolution of the powder therein whereas the washing solution containing the commercial detergent was milky and flocculated at elevated temperatures.

Similar improved washing effects were obtained with Powder A and especially Powder B, when washing nylon and wool test-pieces.

EXAMPLE 3

The sulfo-polycarboxylic acid material prepared as in Example 2, was esterified with 47.8 kgms. of ethoxylated $C_{12} - C_{18}$ straight-chain synthetic alcohol, the ethoxy chain containing 9 ethoxy groups, instead of the 46.9 kgms. of ethoxylated nonyl phenol in the said Example 2.

A detergent powder (Powder C) was formulated with the same general formula as in Example 2, using 5% of the above sulfo-surfactive material.

The washing results in a Launder-O-Meter washing machine on the said Type 1 and Type 2 cotton testpieces, under identical washing conditions, to those set out in Example 2, compared with same commercial powder as used for comparison in Example 2, were as follows:

|  | % Elimination of Soil | |
|---|---|---|
|  | Type 1 | Type 2 |
| Powder C | 28.4 | 67.5 |
| Commercial Powder | 18.4 | 56.3 |

The surfactive material according to the invention is particularly suitable for formulating liquid cleaning fluids, e.g. dish-washing liquids and detergent liquids for washing fabrics, e.g. cotton, wool, and synthetic fibers, i.e. both cellulose-based and made-made fibers.

The use in hard water of conventional cleansing compositions containing anionic surfactants, particularly soap, alkyl benzene sodium sulfonate and organic sodium sulphates, results in flocculation in the absence of water-softening agents, and when such cleansing compositions contain non-ionic surfactants, the tendency for flocculation to occur increases with rising temperature, due to decreasing solubility of the non-ionic surfactant component.

Hitherto it has been the practice to include in liquid powder, paste and gel and like cleansing compositions, a high proportion of a phosphorus-containing compounds to act as a water-softening agent to mitigate the above effects. Such compounds are in practice usually polyphosphates. A problem resulting from the use of such compounds is that when the cleansing composition is discharged as effluent into rivers or the like, the water-softening component has the property of stimulating growth of for example algae. In an attempt to overcome this disadvantage, it has been proposed to use non-phosphorus-containing compounds as sequestering agents, for example nitrilotriacetic acid (known as NTA), or ethylene-diaminetetra acetic acid (known as EDTA). It is considered however that some risks are attached to the use of such nitrogen-containing compounds on account of their possible toxicity.

It is a particular advantage of the surfactive material according to the invention, that when it is incorporated in cleansing compositions, particularly liquid cleansing compositions, there is then no need to incorporate into such compositions water-softening proportions e.g. from 30 to 60% of polyphosphates or nitrogen-containing sequestering agents, as the surfactant material according to the invention is substantially insensitive to water hardness or to the effects of rising temperature, and hence no flocculation occurs, particularly at elevated temperatures. However, relatively small proportions, e.g. from 1 to 10%, preferably 1 to 8% of polyphosphates or nitrogen-containing sequestering agents may be included in such cleansing compositions to act as sequestering agents for iron or copper ions which may be present as impurities in the water used for washing operations.

Such improved properties are possessed by compositions according to the invention, notwithstanding the fact that they may contain proportions of non-ionic surfactants. This effect is illustrated by Example 4 and Example 5.

EXAMPLE 4

A liquid detergent composition was formulated containing 15% by weight of the surfactive material prepared by the procedure of Example 1, and 10% by weight of ethoxylated nonyl phenol containing 9 ethoxy groups per molecule, remainder water. A Type 1 (see Example 3) standard cotton test-piece was then washed in a Launder-O-Meter washing machine at 85°C for 20 minutes, in water containing 220 parts per million of hardness expressed as $CaCO_3$, using different proportions of liquid detergent composition.

The results were compared with a commercial heavy-duty powder containing 20% of total surfactant and 30% of sodium tripolyphosphate. The results were as follows:

| Liquid Detergent according to the invention | % Elimination of Soil |
| --- | --- |
| 0 cc/liter | 3.0 |
| 1 cc/liter | 12.7 |
| 2 cc/liter | 19.7 |
| 4 cc/liter | 19.9 |
| commercial powder 5 grms/liter | 15.2 |

It is to be observed from the above results that a normal performance given by the commercial powder, is 15.2% soil elimination, and that this level was easily surpassed using 2 cc/liter of liquid detergent according to the invention, which detergent contained no water-softening (i.e. sequestering agent).

EXAMPLE 5

A series of aqueous detergent compositions were formulated, each consisting of water of 400 part per million hardness expressed as $CaCO_3$, containing 1 grm./liter of different surfactant materials as follows:

Liquid A. 1 grm./liter of a mixture of $C_{12}$–$C_{18}$ monohydric synthetic alcohols ethoxylated to produce 9 ethoxy groups per hydroxyl equivalent.
Liquid B. 1 grm./liter of a surfactive material prepared according to the procedure of Example 3.
Liquid C. 1 grm./liter of sulfonated tallow alcohol.
Liquid D. 1 grm./liter dodecyl benzene sodium sulfonate.

Each of the liquids was heated to different temperatures, and the turbidity at each temperature measured by absorption of a light of standard intensity through a standard depth of liquid. The results are expressed numerically, the relative turbidity being proportional to the numerical values providing visible flocculation does not take place.

The results were as follows:

| Liquid Used | Temperature | | | | |
| --- | --- | --- | --- | --- | --- |
| | 20°C | 40°C | 60°C | 80°C | 90°C |
| A | 0 | 0 | 0 | i | i |
| B | 27 | 19 | 0 | 0 | 0 |
| C | fl | fl | fl | fl | fl |
| D | fl | fl | fl | fl | fl | fl = visible flocculation.
i = phase separation due to surfactant being thrown out of solution.

It is to be observed from the said results that with increasing temperature, the liquid B containing surfactive material according to the invention surprisingly resulted in decreasing turbidity with increase of temperature, whereas the performance of the other liquids deteriorated with increase of temperature.

Example 6 is provided to illustrate the production of a surfactive material according to the invention which is a complex ester type of material.

EXAMPLE 6

500 ml. of an aqueous solution of sulfo-acid material having a total acidity of 10,650 milliequivalents/liter, obtained by the controlled pyrolysis of calcium citrate at a temperature of from 250°C to 350°C, for 3 hours, followed by hydrolysis and sulfonation of the resulting acid material, and 112 grms. of pure dry diethyleneglycol were introduced into a reaction vessel provided with an agitator and the contents reacted with stirring, at a temperature between 60°C and 85°C under a reduced pressure of about 100 mm Hg. Water was distilled off and the progression of the reaction followed by titration.

When all the diethyleneglycol had reacted, a mixture consisting of 300 grms. of n-butylalcohol and 589 grms. of ethoxylated straight-chain synthetic alcohols obtained by reacting 9 moles of ethylene oxide per hydroxyl equivalent with a mixture of $C_{12}$–$C_{18}$ synthetic straight-chain alcohol of hydroxyl value of 91.0 to 94.0, was introduced into the reaction vessel to esterify the remaining carboxylic acidity. An azeotropic mixture consisting of butylalcohol and water was distilled off and collected in a water separator, the supernatant alcoholic layer being returned continuously to the reaction vessel. After 10 hours, the reaction was almost completed and the remaining acidity was neutralized to pH 7.0 with sodium hydroxide solution and excess butylalcohol removed by distillation under reduced pressure.

This product was a viscous liquid. When dissolved in water having 200 parts per million hardners expressed as $CaCO_3$, it yielded a clear solution. The tendency of the resulting solution to foam was independent of the temperature thereof.

The solution may be used as a liquid detergent, either alone or in combination with other detergents, or as an active ingredient for powdered detergents.

In the detergent liquid compositions of the invention, conventional non-phosphorus builders and/or fillers may be incorporated, such as for example sodium silicate and sodium sulphate. Care should be taken however that the proportion of such builders and/or fillers, particularly sodium silicate, present in the detergent compositions is not sufficiently high to give a degree of alkalinity, e.g. below about pH 10, to the detergent composition that hydrolysis or salting out of the surfactive material according to the invention takes place. To avoid this effect, at least a proportion of said builders and/or fillers may be incorporated in a separate wash composition, e.g. bleach.

What is claimed is:

1. A biodegradable surface-active compound prepared by the process comprising the steps of:
   a. forming an unsaturated polycarboxylic acid material by pyrolyzing an alkaline earth citrate at a temperature between 250° to 400° C. for a period of time until an increase in titratable alkalinity of the reaction mixture is obtained and until not more than 32% by weight of the alkaline earth citrate remains in the reaction mixture, and hydrolyzing the material thus obtained to an acid;
   b. forming an ester from the said acid material by reacting at least one carboxylic acid group thereof with a mono- or polyhydroxy-containing non-ionic surfactant selected from at least one $C_1 - C_{24}$ monohydric or polyhydric aliphatic alcohol and a polyalkoxylated alkyl phenol; and
   c. sulphonating the double bonds of the unsaturated polycarboxylic acid either before or after esterification to form sodium sulphonate groups thereon.

2. A compound as claimed in claim 1 wherein from 25 to 75% of the carboxylic acid groups of the unsaturated polycarboxylic acid are esterified with the said non-ionic surfactant.

3. A compound as claimed in claim 1, wherein all the carboxylic acid groups of the unsaturated polycarboxylic acid are esterified with the said non-ionic surfactant.

4. A compound as claimed in claim 1 wherein at least one of the carboxylic acid groups of the unsaturated polycarboxylic acid which are not esterified with the said non-ionic surfactant, is esterified with at least one $C_1 - C_{24}$ monohydric aliphatic alcohol.

5. A compound as claimed in claim 1 wherein at least one of the carboxylic acid groups of the unsaturated polycarboxylic acid which are not esterified with the said non-ionic surfactant, is esterified with at least one polyhydric aliphatic alcohol.

6. A compound as claimed in claim 5, wherein the said polyhydric alcohol is glycol, glycerol, or a sugar alcohol.

7. A compound as claimed in claim 1, wherein the said polyalkoxylated alkyl phenol is a polyethoxylated alkyl phenol wherein the alkyl side chain(s) each contain 6 to 14 carbon atoms, and wherein the ethoxy chain contains from 2 to 50 ethoxy groups.

8. A compound as claimed in claim 1, wherein the said non-ionic surfactant is an alkoxylated aliphatic monohydric alcohol.

9. A compound as claimed in claim 8, wherein the said alkoxylated aliphatic monohydric alcohol is an ethoxylated $C_8-C_{24}$ alcohol, the ethoxy chain containing from 2 to 50 ethoxy groups.

10. A product as claimed in claim 1, wherein the said unsaturated polycarboxylic acid is esterified with a polyhydroxy alcohol whereby a complex ester is formed, the said esterification with the said polyhydroxy alcohol being carried out before, during or after the esterification with the said non-ionic surfactants, and before, during or after the conversion of the remaining carboxylic acid group(s) if any to form modified carboxylic acid groups.

11. The product of claim 1, wherein the said unsaturated polycarboxylic acid of step (1) is sulfonated across the double bonds of the polycarbocylic acid prior to forming the ester of step (1) and step (2) is correspondingly eliminated.

* * * * *